*The drawing in this paper is not in print.*

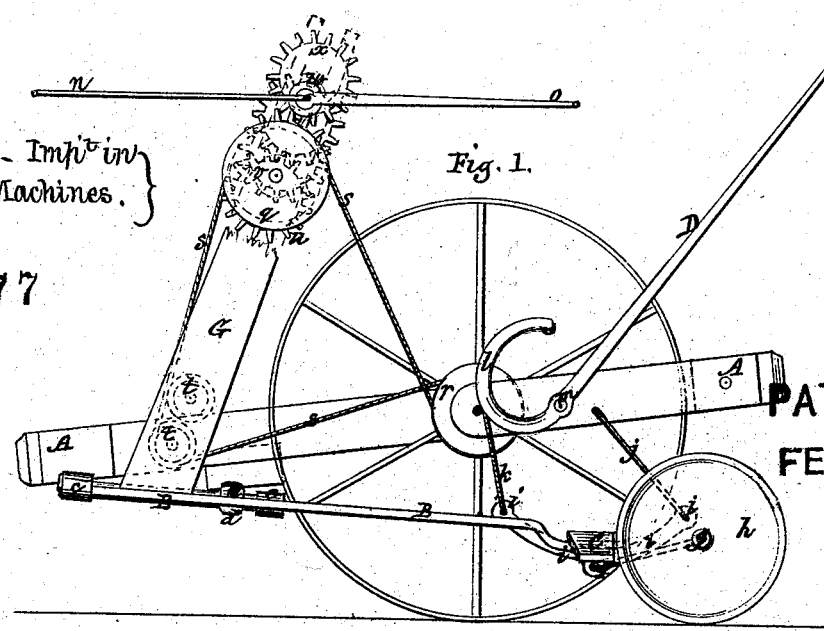
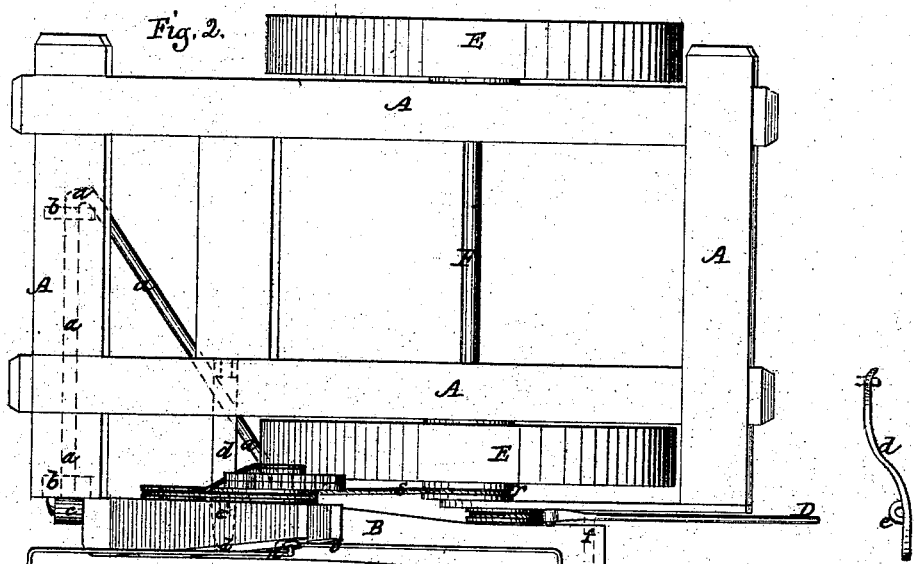
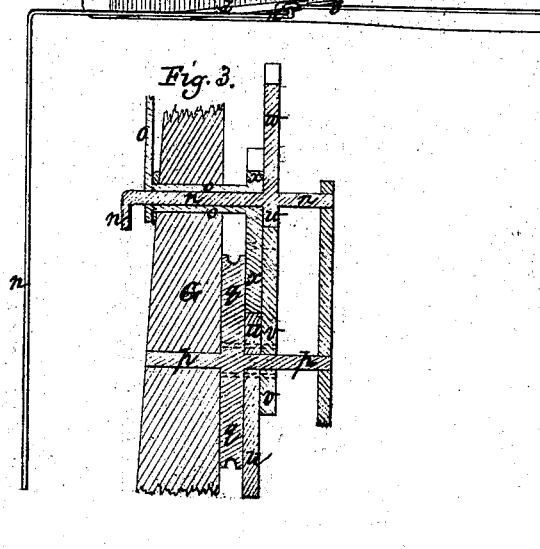

United States Patent Office.

WILLIAM NEFF, OF CENTRE HALL, PENNSYLVANIA.

Letters Patent No. 74,577, dated February 18, 1868.

---

IMPROVEMENT IN HARVESTERS.

---

*The Schedule referred to in these Letters Patent and making part of the same.*

---

TO ALL WHOM IT MAY CONCERN:

Be it known that I, WILLIAM NEFF, of Centre Hall, in the county of Centre, and State of Pennsylvania, have invented certain new and useful Improvements in Harvesting-Machines; and that the following is a full, clear, and exact description of the same, reference being had to the accompanying drawings, making a part of this specification, in which—

Figure 1 is a side view of so much of the machine as will illustrate my invention.

Figure 2 represents a top plan of the same.

Figure 3 represents on an enlarged scale a section through the reel-gearing.

Similar letters of reference, where they occur in the separate figures, denote like parts of the machine in all cases.

My invention consists, first, in the arrangement of devices by which the cutting apparatus is raised up and let down; and secondly, it consists in the device for gauging the drag-bar in one direction, whilst it may swing in the other direction to allow the cutters to rise; and finally, it consists in the gearing for driving the reel-arms at different velocities in different portions of their sweep, and mainly to cause them to run slower when entering the grain, so that their velocity will not beat or thresh out the grain by striking so hard, but be accelerated when sweeping the platform, or after passing the cutters.

To enable others skilled in the art to make and use my invention, I will proceed to describe the same with reference to the drawings.

A represents a main frame, to the front portion of which a V-shaped piece of iron, $a\,a$, is attached by loops or dead-eyes at $b\,b$, and to the ends of this V-shaped piece, as at $c\,c$, the drag-bar B is connected by loops or dead-eyes, so as to turn towards or from the main frame. To the under side of the main frame there is attached a gag-bar or arm $d$, which projects outward and underneath the drag-bar, and prevents it from dropping below a given line or a defined line, and the drag-bar is attached to this gag-bar by a curved pivot, $e$, so that the drag-bar may roll or rock towards the main frame, and back on the gag-bar again when the irregularities in the ground would cause such a motion. To the rear end of the drag-bar B the finger-bar $c$ is attached in any of the usual well-known ways. Underneath or behind the finger-bar $c$ there is a rod, $f$, the outer end of which is bent into a crank form, as at $g$, and has upon it a supporting and raising-wheel, $h$. On the inner end of the rod or shaft $f$, and next to the main frame, there is fastened a rocker-lever, $i$, which projects both in front and in rear of the line of the rod or shaft $f$, and curved upward as in fig. 1. The rear portion of this rocker-lever $i$ is connected by a link, $j$, to the main frame or to a projecting arm thereon, and the front portion of said rocker-lever is connected by a flexible rope or chain, $k$, to an arc, $l$, on a hand-lever, D, which is pivoted at $m$, and then extends upward and towards the driver or conductor's seat, so that the occupant of the seat may seize and operate it. The rod or shaft $f$ is connected by loops to the finger-bar $c$, and by the connection just above described, the lifting of the inner end of the finger-bar turns said shaft or rod, and, through the wheel $h$ on its outer bent end, it raises the outer end of said finger-bar. Thus a simple lever operation at one end of the finger-bar raises up and lets down both ends of it simultaneously. The main frame A is supported upon two carrying-wheels E E, and by the axle F, and the cutters may be driven from these wheels E E by gearing, belts, &c., in the common way. The reel-arms $n\,o$ are driven each by its own gear, so that their revolving motions may not interfere one with the other, and so that also they may enter the grain at less velocity, and consequently with less liability to thresh out the grain, than they have at other portions of their rotations, as follows: G is a reel-support, arranged on the front end of the drag-bar B, and inclining rearward. Upon a shaft or journal, $p$, suitably supported in the reel-arm G, there is arranged a pulley, $q$, around which, and around a pulley, $r$, on the hub of one of the main wheels E, passes an endless belt, $s$, said belt passing in its course in contact with directing-pulleys, as seen at $t\,t$, to keep it taut. Upon the shaft $p$ (fig. 3) there is a gear-wheel, $u$, and adjacent to it, on the same shaft, another though smaller gear $v$, both eccentrically hung upon the shaft, and their greatest eccentricity being diametrically opposite to each other. These two eccentric-gears work into two similar gears $w\,x$, eccentrically hung, one upon the shaft or shank of one of the reel-arms $n$, and the other upon the shaft or shank of the reel-arm $o$; the shaft or shank of the latter, $o$, being hollow, and that of the other arm passing through it. When those portions of the gears that extend the least distance from their shafts are in mesh, the motion of the reel-arm worked by them will be slow, and this motion will increase just as the cogs are more and more remote from the centre of motion. The gears are so arranged that their slowest motion shall be just as the reel-arms enter the standing grain to draw it to the cutters. After this is done, each arm may be accelerated in its movement until it comes around again to where it is to enter and draw in the grain to the cutters. By this means the quick motion of the entire circuit is kept up, without striking the grain so hard as to beat out the grains.

Having thus fully described my invention, what I claim therein as new, is—

The arrangement of the rocker-lever $i$ on the shaft $f$, and its connection to the main frame by a link, $j$, and to the lever D by a flexible connection, $k$, so that operating the lever D will raise and lower the finger-bar at both ends simultaneously, substantially as described.

I also claim, in combination with a hinged drag-bar B, that can roll to and from the main frame, the gag-bar $d$, connected thereto by the curved pivot $e$, as and for the purpose substantially as described.

I also claim the reel-arms, working in the same circuit, but at different velocities, and independent of each other at different portions thereof, when driven through eccentrically-hung circular gears, substantially as described.

WILLIAM NEFF.

Witnesses:
ALEX. SHANNON,
WM. WOLF.